June 6, 1933. A. C. LINDGREN ET AL 1,913,034
HARVESTER THRESHER
Filed Dec. 18, 1931 2 Sheets-Sheet 1
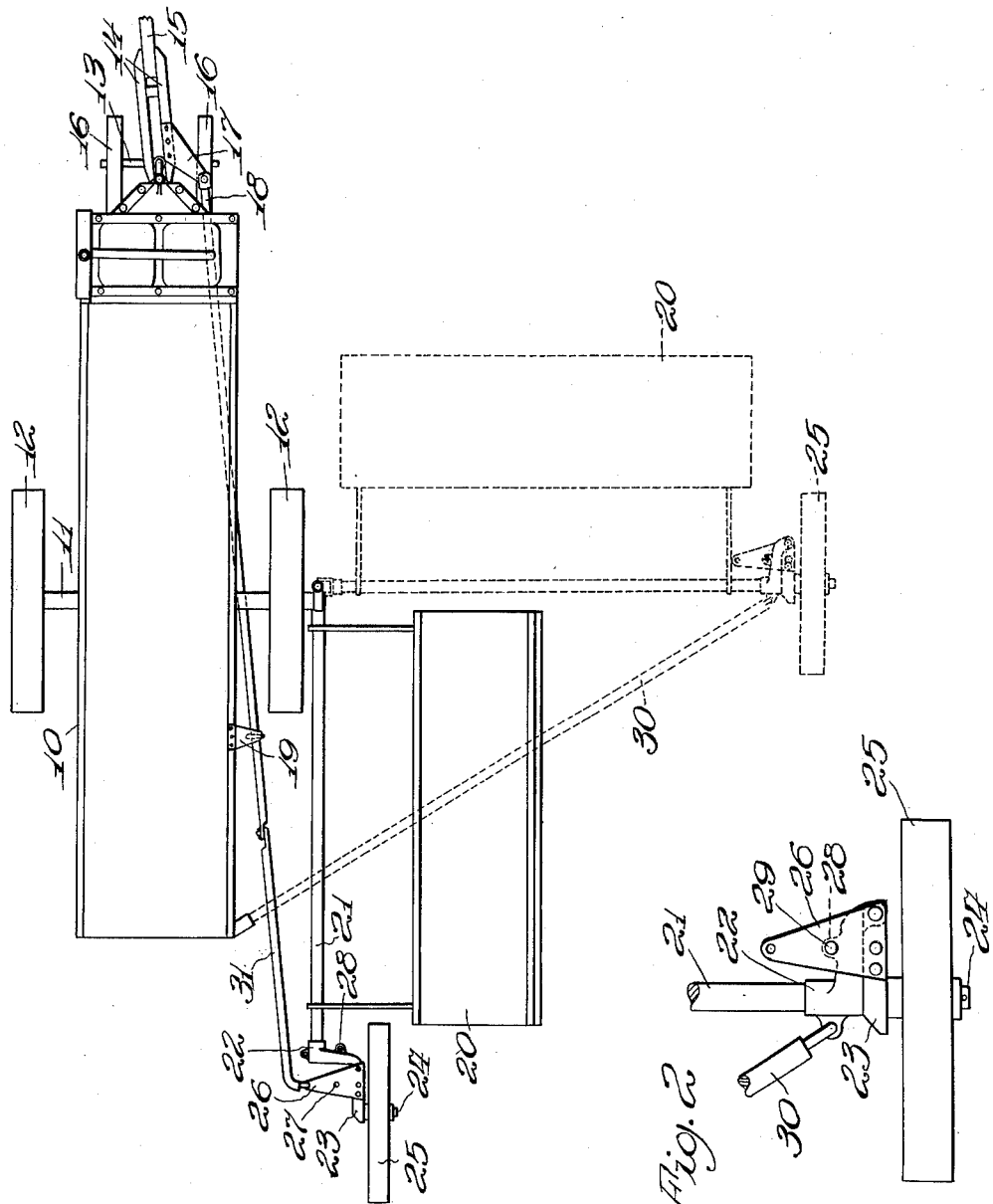
Inventors
Alexus C. Lindgren
Clemma R. Raney
By N. P. Doolittle
Atty.

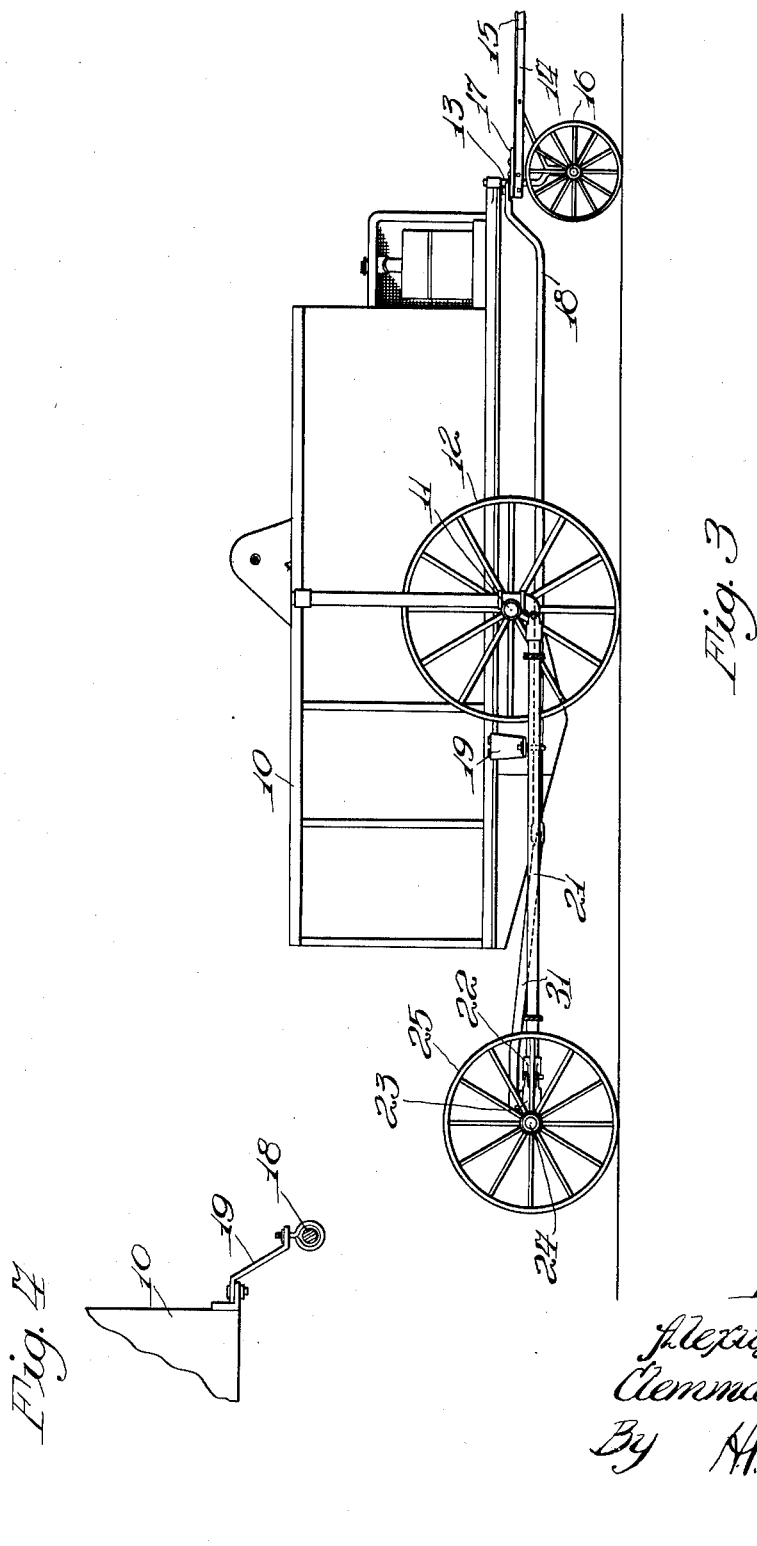

Patented June 6, 1933 1,913,034

UNITED STATES PATENT OFFICE

ALEXUS C. LINDGREN AND CLEMMA R. RANEY, OF CHICAGO, ILLINOIS, ASSIGNORS TO INTERNATIONAL HARVESTER COMPANY, A CORPORATION OF NEW JERSEY

HARVESTER THRESHER

Application filed December 18, 1931. Serial No. 581,824.

This invention relates to harvester threshers and particularly to a combined grain and transport wheel for such machines.

As is well known in the art relating to harvester threshers, these machines usually comprise a rigid main frame carried on an axle and a pair of wheels, which frame supports the grain separating mechanism on the thresher. Laterally offset from the main frame is the harvester part of the machine which includes a supporting axle hingedly and foldingly connected to the main frame or to the axle thereof. This harvester axle is hingedly connected on a longitudinal axis for movement of the harvester in a vertical plane to accommodate the irregularities in the field. Usually the harvester part is also foldingly connected to the main frame so that it may be swung back in a horizontal plane for the purpose of narrowing materially the width of the machine so that it may more easily be transported through gateways and along narrow highways.

It is quite common at the present time to provide harvester threshers with the folding feature above referred to. The present invention contemplates an improvement in a thresher of this type; the principal object being to provide a novel grain and transport wheel.

Another principal object is to provide a mounting for the grain and transport wheel, embodying means for locking the wheel against swiveling movement when the platform is in extended operative position and to provide for swiveling movement of the wheel when the platform is in trailing position.

Another object is to provide means for connecting the grain and transport wheel when in trailing position to a front tongue truck of the harvester thresher, whereby the swiveling movement of the grain wheel is controlled by the operation of the tongue truck.

Other objects will be apparent from the drawings and the detailed description to follow.

A preferred form of the device in which the invention is embodied and by which the objects of invention are obtained is shown in the drawings, in which:

Figure 1 is a plan view, showing diagrammatically the essential elements of the frame of a harvester thresher with the harvester part in folded position, the dotted lines in said figure showing the harvester part in extended operative position;

Figure 2 is an enlarged detail, showing a grain and transport wheel when in locked position, with the harvester part in extended operative position;

Figure 3 is an elevation of the same structure shown in Figure 1, with the harvester part in trailing position for transport; and Figure 4 is an enlarged detailed view, showing a bracket which supports the steering rod for the transport wheel.

Only such parts of the harvester thresher have been illustrated as are necessary to disclose the features of the present invention as such machines are well known in the art.

Said machine, as illustrated, consists of a main frame 10 supported on an axle 11, which is provided with ground engaging wheels 12. The main frame is also supported at its front end by a tongue truck 13 pivotally connected to the frame on a vertical axis, whereby it may be steered with respect to the main frame. A forwardly extending structure 14 is connected to the tongue truck to provide means for attaching a tongue 15. The tongue truck is also provided with a pair of spaced wheels 16. A bracket 17 secured to the frame structure 14 and laterally extending therefrom, forms a means for connecting a rod 18, by which the transport wheel is steered. The rod 18 is guided and held in position by a bracket 19 connected to the main frame. The axle 11 extends laterally to provide means for attaching the harvester part 20 of the machine, which will be hereinafter designated as the harvester mechanism, on the main frame being considered as the thresher. The harvester 20 is supported on an axle 21, which is hinged to the axle 11. At the outer end of the axle 21 a bracket member 22 is rigidly secured. Said member extends forwardly and laterally to provide a means for pivotally attaching on a vertical axis the wheel carrying member 23. Said member is provided with a stub axle 24, on which the grain and transport wheel 25 is rotatably mounted. A lever member 26 is secured to the wheel carrying member 23 and extends laterally therefrom. Said member is provided with an opening 27 in alignment with an opening formed in an ear 28 formed as a part of the bracket member 22. A pin 29, extending through said openings, locks the grain and transport wheel against swiveling movement when the harvester is in extended operative position. A bracing bar 30, secured to the rear of the main frame and to the bracket member 22, is utilized for holding the harvester in extended position. When the harvester is swung around a trailing position for transport, the pin 29 is removed and the wheel carrying member 23 is swung around until the wheel 25 extends in the line of draft. The lever member 26 is then extending laterally. A rod 31, pivotally connected to the lever member at its outer end, is connected to the end of the rod 18. This connection links the lever member 26 with the laterally extending bracket 17 on the front tongue truck. It will be understood that the members as shown, are so proportioned, and the pivots are so positioned, that the transport wheel 25 will be turned with and by the front tongue truck in the same direction. This construction enables comparatively short turns to be made while transporting the harvester thresher. The means for locking the grain wheel when the harvester is in operative position assures the position of said wheel during backing of the harvester thresher or movement in any angular direction. It is not essential in the operation of such a machine that the grain wheel be provided with swiveling movement. In fact, it is quite desirable to have the wheel locked when the harvester is moved rearwardly or when the outer end is moved rearwardly in making a sharp right turn.

It is to be understood that applicants have shown and described only a preferred embodiment of their novel grain and transport wheel for harvester threshers and that they claim as their invention all modifications falling within the scope of the appended claims.

What is claimed is:

1. In a harvester thresher of the class described, a support for the thresher including a steerable truck, a support for the harvester, means connecting the support to the thresher for folding the harvester alongside the thresher, a supporting wheel carried at the outer end of the harvester, said wheel being mounted on a member pivoted to the harvester on a vertical axis, means for locking said member against movement with respect to the harvester when the harvester is in extended operative position, and means to connect said member to the steerable truck for simultaneous angling therewith when the harvester is in folded position.

2. In a harvester thresher a main frame, supporting means for said frame including a steerable truck, a harvester including an axle foldingly connected to the main frame, a wheel supporting the outer end of the harvester, said wheel being carried by a member swiveled to the harvester on a vertical axis, means for locking said member with respect to the harvester when the harvester is in extended operative position, and means for connecting the wheel carrying member to the main frame truck when the harvester is in folded position, whereby the said wheel will be simultaneously angled with and by the main frame truck.

3. In a machine of the class described, a main frame, a harvester including an axle laterally offset from the main frame and foldingly connected thereto for rearward and horizontal folding, an arm on the free end of the axle, a wheel swiveled on said arm, means for locking said wheel against swiveling movement with respect to the harvester when the harvester is in extended operative position, and means for connecting the swiveled wheel to the main frame truck when the harvester is in folded position whereby said wheel is steered with the front truck.

4. In a harvester thresher of the class described, a wheel supported main frame including a steerable front truck, a harvester pivotally connected to said frame for rearward and horizontal folding movement with respect thereto, and removable means for maintaining the harvester in laterally extended position, a wheel carrying member pivoted at the outer end of the harvester on a vertical axis, means for locking said member against movement with respect to the harvester during operation thereof when in extended position, and means including a lever arm extending away from the pivot axis of the wheel carrying member for connecting said member to the steerable front truck whereby the truck and the wheel may be simultaneously angled.

In testimony whereof we affix our signatures.

ALEXUS C. LINDGREN.
CLEMMA R. RANEY.